(12) United States Patent
Homma

(10) Patent No.: US 8,786,882 B2
(45) Date of Patent: Jul. 22, 2014

(54) IMAGE PROCESSING APPARATUS, CONTROL METHOD FOR CONTROLLING IMAGE PROCESSING APPARATUS, AND STORAGE MEDIUM TO EXECUTE A PROCESS DEFINED IN A JOB TICKET

(75) Inventor: Takayuki Homma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 13/125,025

(22) PCT Filed: Oct. 30, 2009

(86) PCT No.: PCT/JP2009/005768
§ 371 (c)(1),
(2), (4) Date: Apr. 19, 2011

(87) PCT Pub. No.: WO2010/050229
PCT Pub. Date: May 6, 2010

(65) Prior Publication Data
US 2011/0199646 A1 Aug. 18, 2011

(30) Foreign Application Priority Data
Oct. 31, 2008 (JP) .................................. 2008-281868

(51) Int. Cl.
*G06F 3/12* (2006.01)
*G06K 15/00* (2006.01)

(52) U.S. Cl.
USPC ......................................... 358/1.15; 358/1.13

(58) Field of Classification Search
USPC ........ 358/1.1, 1.9, 1.13, 1.14, 1.15, 402, 468; 709/101, 201, 203
See application file for complete search history.

(56) References Cited

U.S. PATENT DOCUMENTS

| 6,850,336 | B1 * | 2/2005 | Purvis et al. .................. 358/1.15 |
| 7,095,519 | B1 * | 8/2006 | Stewart et al. ................ 358/1.15 |
| 7,640,294 | B2 * | 12/2009 | Maekawa ....................... 709/203 |
| 7,664,555 | B2 * | 2/2010 | Kawai .............................. 700/17 |
| 8,368,919 | B2 * | 2/2013 | Morales et al. ............... 358/1.15 |
| 2002/0194245 | A1 * | 12/2002 | Simpson et al. .............. 709/101 |
| 2006/0221356 | A1 | 10/2006 | Kawai |
| 2007/0229879 | A1 * | 10/2007 | Harmon et al. ............... 358/1.15 |
| 2008/0273224 | A1 * | 11/2008 | Maulsby et al. .............. 358/1.15 |

FOREIGN PATENT DOCUMENTS

| CN | 101237513 | A | 8/2008 |
| JP | 08-278947 | A | 10/1996 |
| JP | 2002-044336 | A | 2/2002 |
| JP | 2002-44336 | A | 2/2002 |
| JP | 2002-344678 | A | 11/2002 |
| JP | 2003-117274 | A | 4/2003 |
| JP | 2004-272390 | A | 9/2004 |
| JP | 2004-287860 | A | 10/2004 |
| JP | 2005-156762 | A | 6/2005 |
| JP | 2005-262754 | A | 9/2005 |
| JP | 2006-301072 | A | 11/2006 |
| JP | 2006-302038 | A | 11/2006 |
| JP | 2007-213566 | A | 8/2007 |
| JP | 2007-272900 | A | 10/2007 |

* cited by examiner

*Primary Examiner* — Gabriel Garcia
(74) *Attorney, Agent, or Firm* — Canon USA, Inc., IP Division

(57) ABSTRACT

An image processing apparatus may execute a process defined in a job ticket. The image processing apparatus includes a holding unit to hold a job ticket defining a plurality of processes. A display control unit of the image processing apparatus performs control to display, on a display unit, pieces of information about the plurality of processes defined in the job ticket held in the holding unit.

18 Claims, 20 Drawing Sheets

Fig. 18

```xml
<?xml version="1.0" encoding="UTF-8" ?>
<Process id="0001" creator="192.168.0.101" caption="mail sending" comment=" send scanned document by attaching it to mail ">
  <Scan>
    <Setting type="format" changeable="0">
      JPEG
    </Setting>
    <Setting type="resolution" changeable="0">
      300*300
    </Setting>
    <Setting>...</Setting>
  </Scan>
  <Send type="email">
    <Setting type="address" changeable="1">
      taro@xxxx.yyy
    </Setting>
    <Setting>...</Setting>
  </Send>
  ...
</Process>
```

JOB TICKET 2001, 2002, 2003, 2004, 2005, 2006

Fig. 19

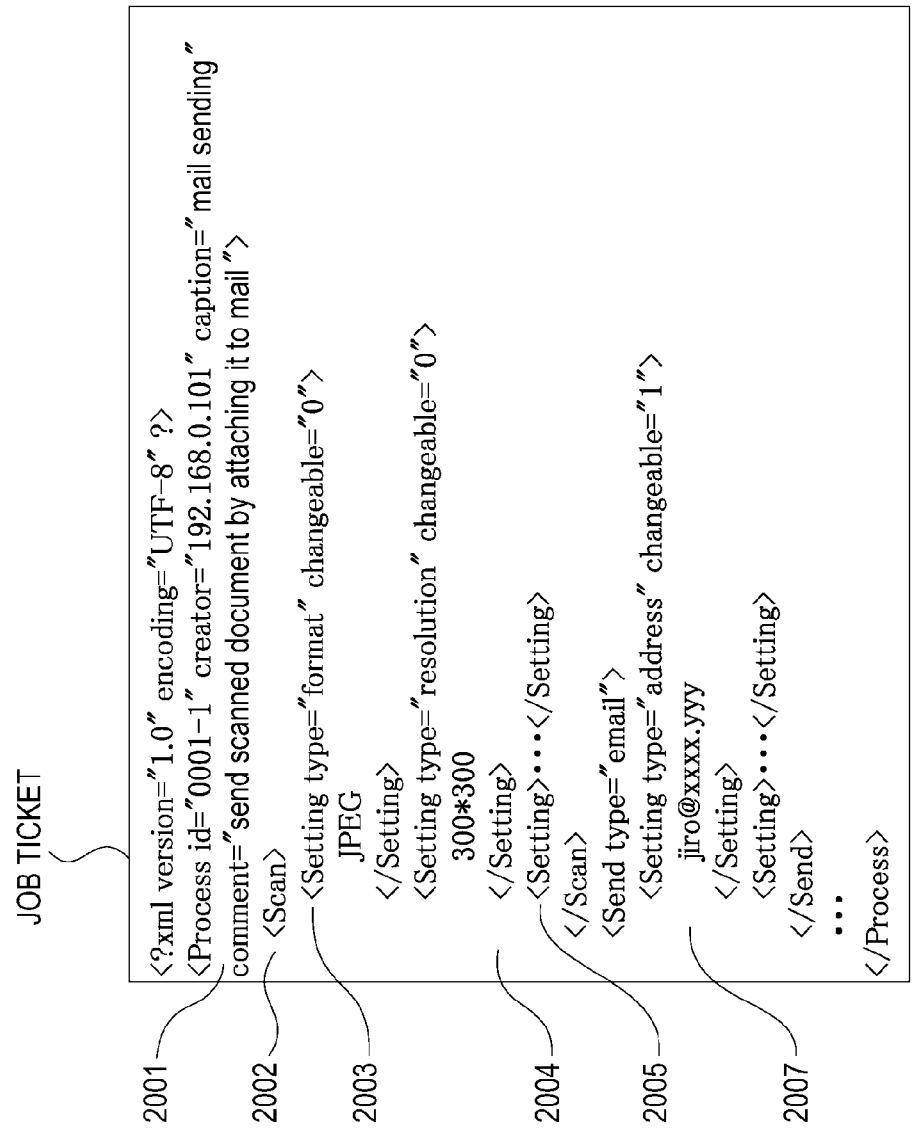

JOB TICKET

```
<?xml version="1.0" encoding="UTF-8" ?>
<Process id="0001-1" creator="192.168.0.101" caption=" mail sending" comment=" send scanned document by attaching it to mail ">
    <Scan>
        <Setting type="format" changeable="0">
            JPEG
        </Setting>
        <Setting type="resolution" changeable="0">
            300*300
        </Setting>
        <Setting>...</Setting>
    </Scan>
    <Send type="email">
        <Setting type="address" changeable="1">
            jiro@xxxx.yyy
        </Setting>
        <Setting>...</Setting>
    </Send>
    ...
</Process>
```

|  | DISPLAY PRIORITY 1 | DISPLAY PRIORITY 2 | DISPLAY PRIORITY 3 |
|---|---|---|---|
| JOB TICKET | NAME: caption | NAME: comment | NAME: address |

Fig. 21

|   | Process id | Process id | Process id |
|---|---|---|---|
| 1 | 0001 | 0001-1 (change address) | 0001-11 (change address) |
|   |      | 0001-2 (change address) |   |
| 2 | 0002 |   |   |
| 3 | 0003 | 0003-1 (change reading resolution) |   |

IMAGE PROCESSING APPARATUS, CONTROL METHOD FOR CONTROLLING IMAGE PROCESSING APPARATUS, AND STORAGE MEDIUM TO EXECUTE A PROCESS DEFINED IN A JOB TICKET

CROSS REFERENCE TO RELATED APPLICATIONS

This application is a National Stage filing of PCT application No. PCT/JP09/005768, filed Oct. 30, 2009, which claims priority from Japanese Patent Application No. 2008-281868, filed Oct. 31, 2008, all of which are hereby incorporated by reference herein in their entirety.

TECHNICAL FIELD

The present invention relates to an image processing apparatus, a control method for controlling an image processing apparatus, and a storage medium.

BACKGROUND ART

Hitherto, there have existed image processing apparatuses, such as a scanner, a facsimile apparatus, and a multifunction peripheral (MFP), that receive a job ticket generated in advance and that operate in accordance with parameters defined in the received job ticket.

Some of those image processing apparatuses display a plurality of job tickets, select a desired job ticket from among the displayed job tickets, and allow a process to be executed in accordance with the selected job ticket (see PTL1).

However, in the conventional image processing apparatuses, a screen for displaying job tickets has a simple structure, so that it is difficult for a user to recognize which process is performed in accordance with which job ticket.

CITATION LIST

Patent Literature

PTL 1: Japanese Patent Laid-Open No. 2004-287860

SUMMARY OF INVENTION

According to an embodiment of the present invention, there is provided an image processing apparatus capable of executing a process defined in a job ticket. The image processing apparatus includes a holding unit configured to hold a job ticket defining a plurality of processes, and a display control unit configured to perform control to display, on a display unit, pieces of information about the plurality of processes defined in the job ticket held in the holding unit.

Further features of the present invention will become apparent from the following description of exemplary embodiments with reference to the attached drawings.

BRIEF DESCRIPTION OF DRAWINGS

FIG. 18 illustrates a job ticket according to the embodiment of the present invention.

FIG. 19 illustrates a job ticket according to the embodiment of the present invention.

FIG. 20 illustrates a display priority management table according to the embodiment of the present invention.

FIG. 21 illustrates an edit management table according to the embodiment of the present invention.

DESCRIPTION OF EMBODIMENTS

Hereinafter, an embodiment of the present invention will be described with reference to the attached drawings.

Figure 1:
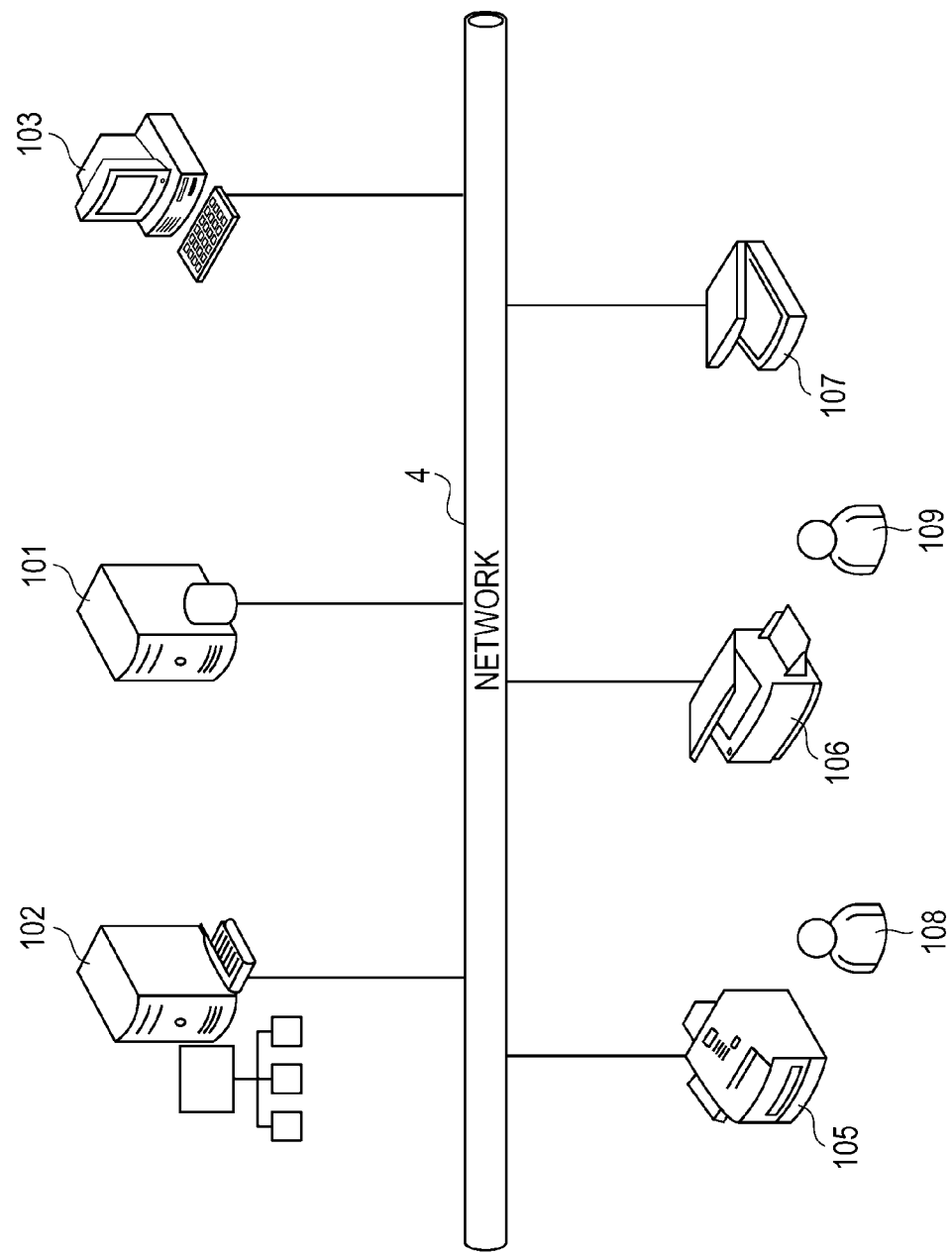
FIG. 1 illustrates a configuration of an image processing system according to an embodiment of the present invention.

FIG. 1 illustrates a system configuration according to this embodiment. An image processing system according to this embodiment includes a job ticket processing server 101, a job ticket management server 102, an administrator PC (Personal Computer) 103, an apparatus 105, an apparatus 106, and an apparatus 107, which are mutually connected via a network 4.

Each of the apparatuses 105 to 107 is an apparatus that includes a scanner, that reads a document by the scanner, and that sends image data of the read document to another apparatus or terminal connected to the network 4. Each of these apparatuses 105 to 107 may be an apparatus having a single function of a scanner, or may be an MFP (Multifunction Peripheral) capable of executing a plurality of functions of scan, print, FAX, and the like.

The administrator PC 103 is a terminal for generating or editing a job ticket describing processing information that is used in the apparatus 105, 106, or 107, or the job ticket processing server 101.

The processing information described in a job ticket includes specification of a resolution for reading image data, a reading size, color reading/monochrome reading, and luminance adjustment, and processes performed after the image data has been read (e.g., E-mail sending, file sending, and OCR (Optical Character Recognition) processing).

The job ticket management server 102 is a server for storing/managing job tickets generated by the administrator PC 103 by associating the job tickets with user information. The job ticket management server 102 obtains a job ticket from the apparatus 105, 106, or 107, or the job ticket processing server 101 that executes processes in accordance with processing information described in the job ticket. If the job ticket management server 102 has a configuration capable of storing and obtaining job tickets, a directory service (e.g., an active directory) may be adopted for the job ticket management server 102.

The job ticket processing server 101 is a server for performing a series of post-processes described in a job ticket on image data sent from the apparatus 105, 106, or 107. Here, an example of the post-processes includes a process of sending a file of image data to a file server in accordance with settings in a job ticket. Another example includes a process of sending an E-mail to an E-mail server in accordance with settings in a job ticket.

A user 108 and a user 109 are users who actually operate the apparatuses 105 to 107.

Figure 2:
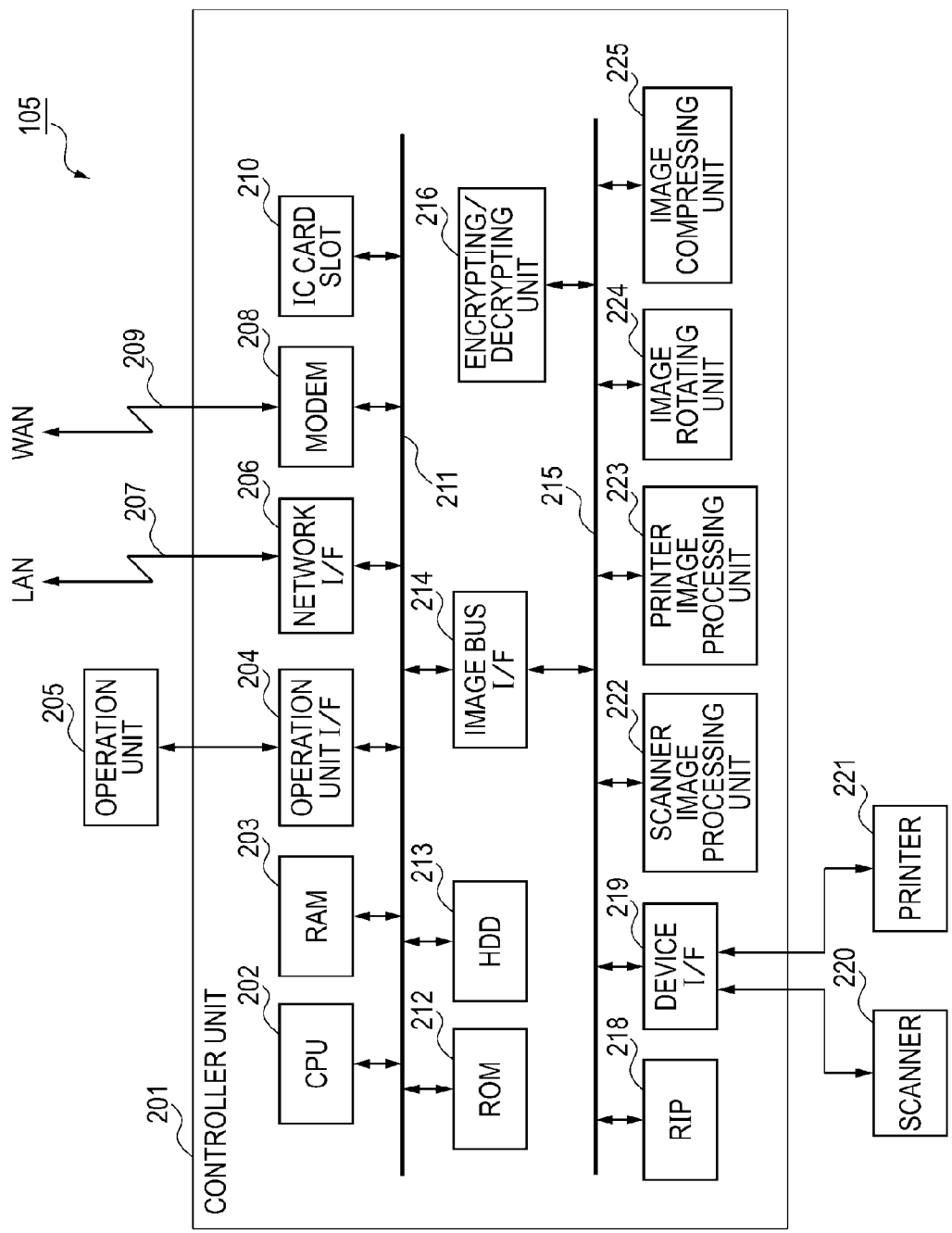
FIG. 2 illustrates a configuration of an apparatus according to the embodiment of the present invention.

FIG. 2 is a block diagram illustrating an exemplary configuration of the apparatus 105 according to the embodiment.

The apparatus 105 includes a controller unit 201, an operation unit 205, a scanner 220, and a printer 221.

The controller unit 201 includes a CUP (Central Processing Unit) 202, a RAM (Random Access Memory) 203, an operation unit I/F (interface) 204, a Network I/F 206, a MODEM (modulator-demodulator) 208, an IC card slot 210, a ROM (Read Only Memory) 212, an HDD (Hard Disk Drive) 213, and an image bus I/F 214. These units are mutually connected via a system bus 211.

Also, the controller unit 201 includes a RIP (Raster Image Processor) 218, a device I/F 219, a scanner image processing unit 222, a printer image processing unit 223, an image rotating unit 224, an image compressing unit 225, and an encrypting/decrypting unit 216. These units are mutually connected via an image bus 215. A PCI (Peripheral Component Interconnect) bus, IEEE 1394, or the like is used as the image bus 215.

The image bus I/F 214 is a bus bridge that connects the system bus 211 to the image bus 215 for transferring image data at high speed and that converts a data structure.

Furthermore, the controller unit 201 is connected to the operation unit 205, the scanner 220, and the printer 221.

The CPU 202 generally controls the entire apparatus 105 in accordance with a program stored in the ROM 212.

The RAM 203 is a system work memory used by the CPU 202 to operate, and also serves as an image memory for temporarily storing image data. Also, the RAM 203 functions as a work memory of the CPU 202.

The operation unit I/F 204 is an interface unit provided for the operation unit 205, and outputs image data to be displayed on the operation unit 205 to the operation unit 205. Also, the operation unit I/F 204 provides instructions accepted from a user via the operation unit 205 to the CPU 202.

The network I/F 206 is an interface unit provided for a LAN (Local Area Network) 207, and inputs/outputs communication data via the LAN 207.

The MODEM 208 controls sending and receiving of data via a WAN (Wide Area Network) 209.

The ROM 212 stores a boot program of the system and various programs read by the CPU 202.

The HDD 213 stores application programs and image data.

The RIP 218 converts a PDL (Page Description language) code into a bitmap image.

The device I/F 219 is an interface unit provided for the scanner 220 and the printer 221, which are image input/output devices, and performs input/output control of image data for the scanner 220 and the printer 221.

The scanner image processing unit 222 corrects, processes, or edits image data input thereto.

The printer image processing unit 223 performs correction, resolution conversion, and the like on the printer 221 for image data to be printed out.

The image rotating unit 224 rotates image data.

The image compressing unit 225 compresses and decompresses image data, for example, in accordance with the JPEG (Joint Photographic Experts Group) method for multivalued image data, and the JBIG (Joint Bi-level Image Experts Group), MMR (Modified Modified read), or MH (Modified Huffman) method for binary image data.

The IC card slot 210 is used for inserting an IC card medium thereto. Inputting an appropriate PIN (Personal Identifier Number) code after the insertion enables input/output of a key used for encryption/decryption.

The encrypting/decrypting unit 216 is a hardware accelerator board that performs a data encrypting/decrypting process by using the key of the IC card slot 210.

A description has been given above about the configuration of the apparatus 105 serving as an MFP with reference to FIG. 2. The apparatuses 106 and 107 have a configuration similar to the above-described configuration. Note that the apparatus 106 does not have the IC card slot 210 and the encrypting/decrypting unit 216 and that the apparatus 107 does not have the printer 221.

Figure 3:
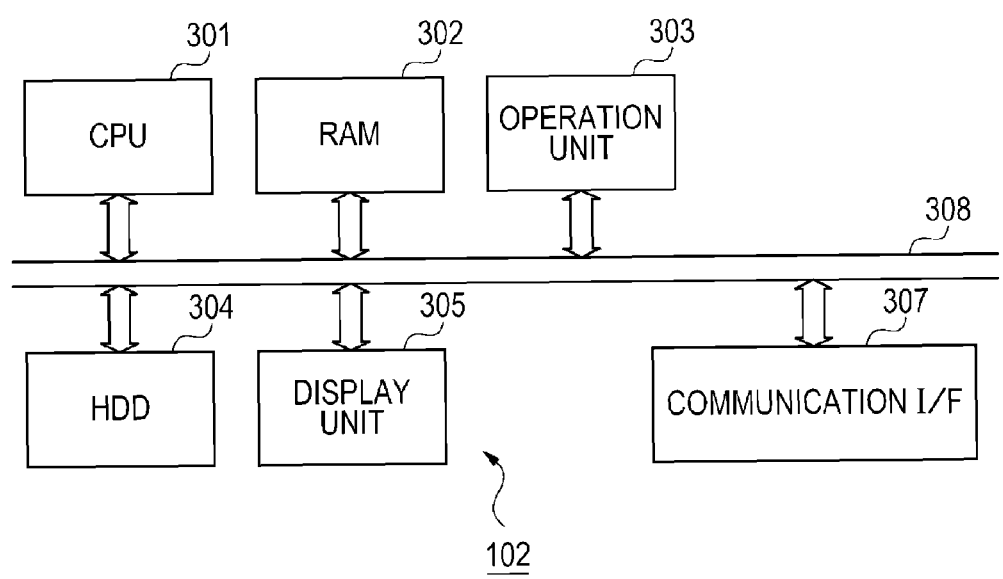
FIG. 3 illustrates a configuration of a job ticket management server according to the embodiment of the present invention.

FIG. 3 illustrates an exemplary configuration of the job ticket management server 102 according to this embodiment. The job ticket management server 102 includes a CPU 301, a RAM 302, an operation unit 303, an HDD 304, a display unit 305, and a communication I/F 307, which are mutually connected via a main bus 308.

The CPU 301 generally controls the job ticket management server 102. The RAM 302 stores a program read by the CPU 301. The operation unit 303 includes a keyboard, a mouse, and the like, and accepts a user operation. The HDD 304 stores job tickets. The HDD 304 may be a nonvolatile memory, such as an NVRAM (Nonvolatile RAM). The display unit 305 is a display, which displays various screens. The communication I/F 307 sends/receives data to/from another apparatus via the network 4.

Figure 4:
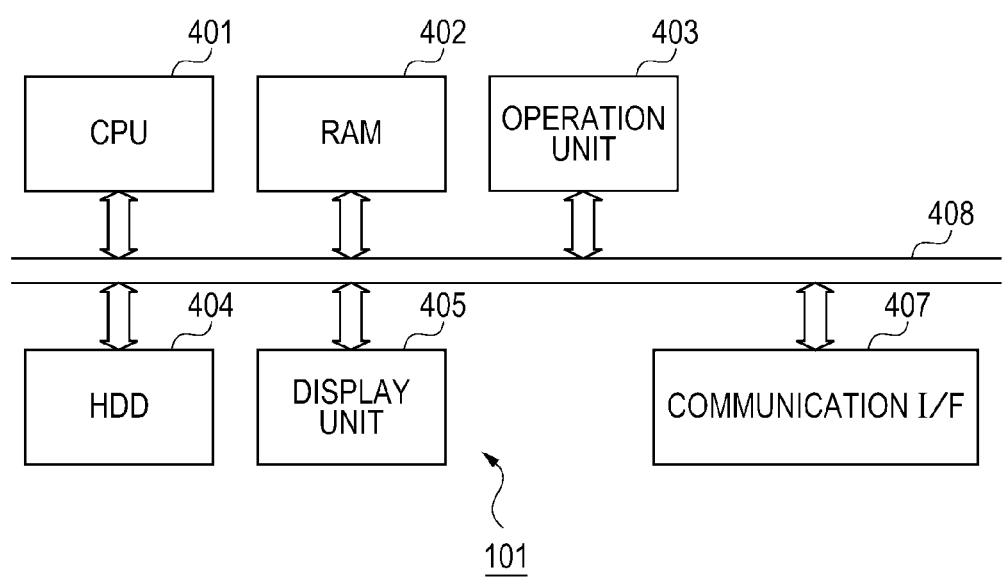
FIG. 4 illustrates a configuration of a job ticket processing server according to the embodiment of the present invention.

FIG. 4 illustrates an exemplary configuration of the job ticket processing server 101. The job ticket processing server 101 includes a CPU 401, a RAM 402, an operation unit 403, an HDD 404, a display unit 405, and a communication I/F 407, which are mutually connected via a main bus 408.

The CPU 401 generally controls the job ticket processing server 101. The RAM 402 stores a program read by the CPU 401. The operation unit 403 includes a keyboard, a mouse, and the like, and accepts a user operation. The HDD 404 stores job tickets. The HDD 404 may be a nonvolatile memory, such as an NVRAM. The display unit 405 is a display, which displays various screens. The communication I/F 407 sends/receives data to/from another apparatus via the network 4.

Figure 5:
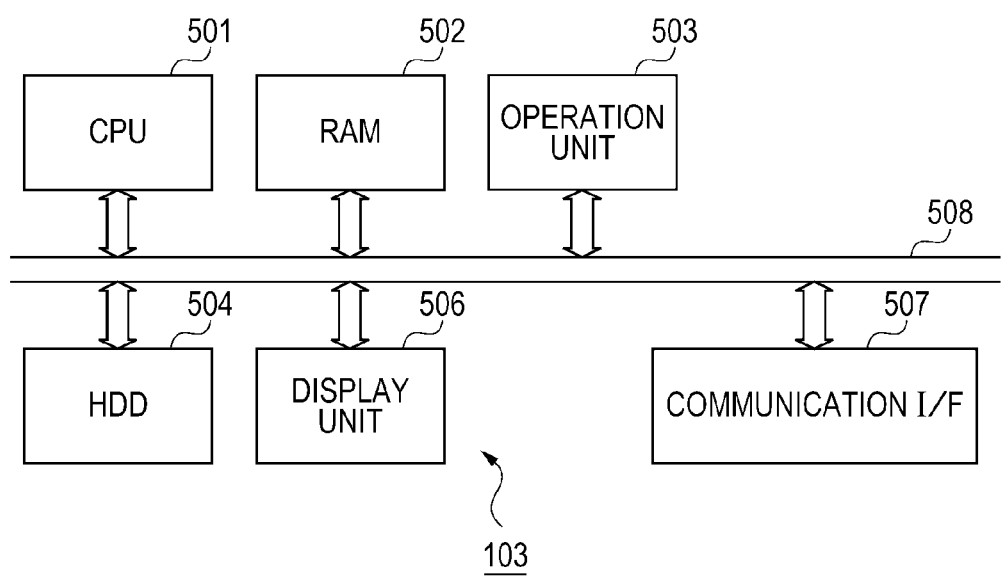
FIG. 5 illustrates a configuration of an administrator PC according to the embodiment of the present invention.

FIG. 5 illustrates an exemplary configuration of the administrator PC 103. The administrator PC 103 includes a CPU 501, a RAM 502, an operation unit 503, an HDD 504, a display unit 506, and a communication I/F 507, which are mutually connected via a main bus 508.

The CPU 501 generally controls the administrator PC 103. The RAM 502 stores a program read by the CPU 501. The operation unit 503 includes a keyboard, a mouse, and the like, and accepts a user operation. The HDD 504 stores application programs and various settings. The HDD 504 may be a non-volatile memory, such as an NVRAM. The display unit 506 is a display, which displays various screens. The communication I/F 507 sends/receives data to/from another apparatus via the network 4.

Hereinafter, a description will be given about a method for limiting the use of functions of the apparatus 105 by using a job ticket when a user uses the apparatus 105 in the image processing system having the above-described configuration. A job ticket is a file that defines functions usable by a user among the functions of the apparatus 105. In this embodiment, a description will be given about a case of using a job ticket for processes in the apparatus 105, but the job ticket can also be used in the apparatus 106 or 107.

Figure 6:
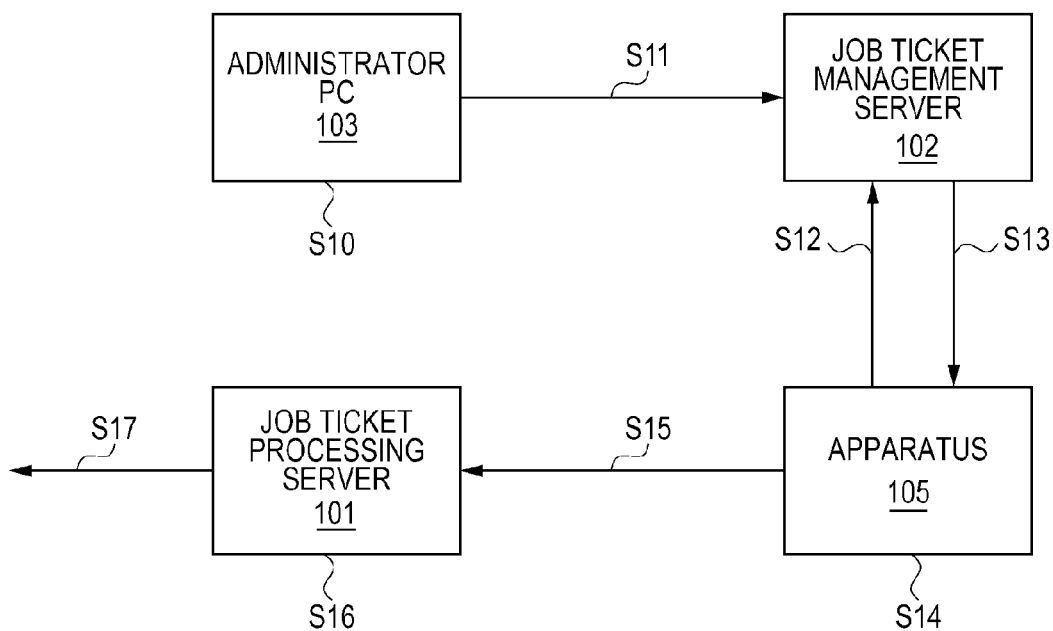
FIG. 6 illustrates a flow of a process using a job ticket according to the embodiment of the present invention.

A flow of an actual process will be described with reference to FIG. 6.

First, an administrator generates job tickets by using the administrator PC 103 (S10). Application software for generating and editing job tickets is installed in advance to the administrator PC 103. The administrator starts the application software when he/she wants to generate job tickets. Then, the administrator generates job tickets by operating the started application software and registers the generated job tickets in the job ticket management server 102 (S11). At this time, the job tickets are registered in the job ticket management server 102 by being associated with a user ID that identifies a user.

The user of the apparatus 105 inputs his/her user ID and password to log into the apparatus 105 when the user uses the apparatus 105. Then, the user starts a web browser installed in the apparatus 105 and inputs the address of the job ticket management server 102, thereby accessing the job ticket management server 102 (S12). At this time, the apparatus 105 sends the user ID that was input by the user at login to the job ticket management server 102.

The job ticket management server 102 accessed by the apparatus 105 identifies the user on the basis of the user ID sent from the apparatus 105 and sends job tickets that are managed by being associated with the user to the apparatus 105 (S13). The apparatus 105 that has received the job tickets displays a list of the job tickets on the operation unit 205 of the apparatus 105.

The user selects a desired job ticket from the displayed list of the job tickets. The apparatus 105 performs control for reading a document by the scanner 220 or sending image data obtained through reading the document by the network I/F 206 in accordance with parameters included in the selected job ticket. For example, in a case where the job ticket specifies an image format and a reading resolution, the apparatus 105 reads a document at the reading resolution specified in the job ticket, converts image data obtained thereby into the image format specified in the job ticket, and stores the image data in the HDD 213 (S14).

Then, the apparatus 105 sends the image data stored in the HDD 213 and the job ticket to the job ticket processing server 101 (S15).

The job ticket processing server 101 processes the image data of the document received from the apparatus 105 in accordance with information in the job ticket received from the apparatus 105 (S16). For example, in a case where the information in the job ticket defines E-mail sending to an address A, the job ticket processing server 101 sends the received image data to the address A by attaching the image data to an E-mail (S17).

Both of the apparatus 105 and the job ticket processing server 101 do not accept any instructions from the user about processing information that is not specified in the job ticket, and operate in accordance with only the processing information determined by parameters specified in the job ticket. That is, the job ticket specifies processing information that should be used in the apparatus 105 and the job ticket processing server 101 as parameters.

As described above, the apparatus 105 and the job ticket processing server 101 execute processes in accordance with only the information specified in the job ticket, whereby the processing information used by the apparatus 105 can be limited to the information specified in the job ticket.

Next, a description will be given about a flow of a specific process in a case where a job ticket is generated in the administrator PC 103 by using a flowchart.

First, a flow of a process in the administrator PC 103 will be described with reference to the flowchart in FIG. 7. The respective steps in the flowchart in FIG. 7 are performed when the CPU 501 of the administrator PC 103 executes a program read from a ROM.

Figure 7:
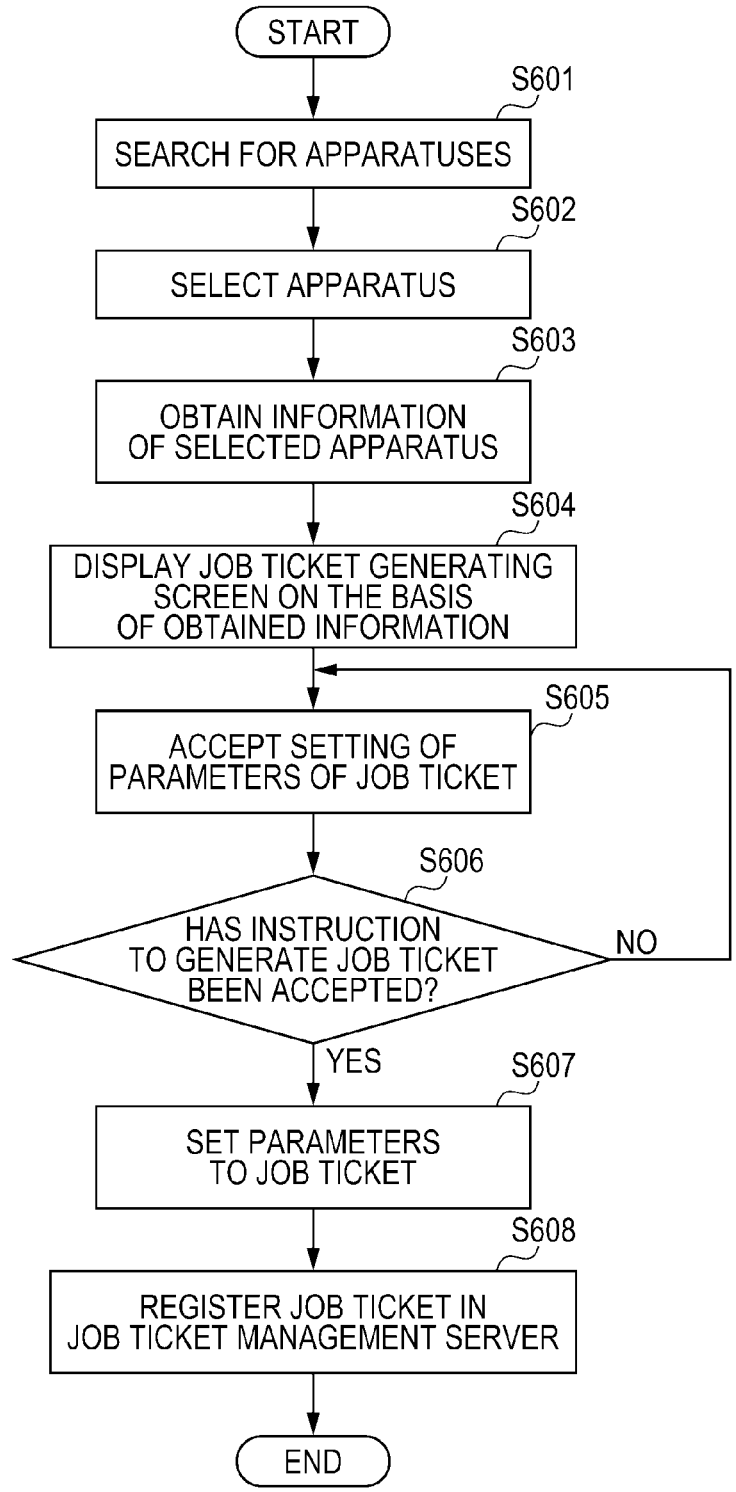
FIG. 7 is a flowchart illustrating an example of a control procedure performed by the administrator PC according to the embodiment of the present invention.

The CPU 501 starts the flowchart illustrated in FIG. 7 when an application for generating a job ticket is started by a user.

First, in step S601, the CPU 501 searches for apparatuses connected to the network 4.

In step S602, the CPU 501 displays a screen for displaying apparatuses found through the search, and accepts selection of an apparatus from the user.

In step S603, the CPU 501 sends a request for obtaining configuration information of the selected apparatus to the apparatus via the network 4, and receives a response, that is, the configuration information of the apparatus.

In step S604, the CPU 501 displays, on the display unit 506, a setting screen for making settings of a job ticket on the basis of the received configuration information of the apparatus.

Figure 8:
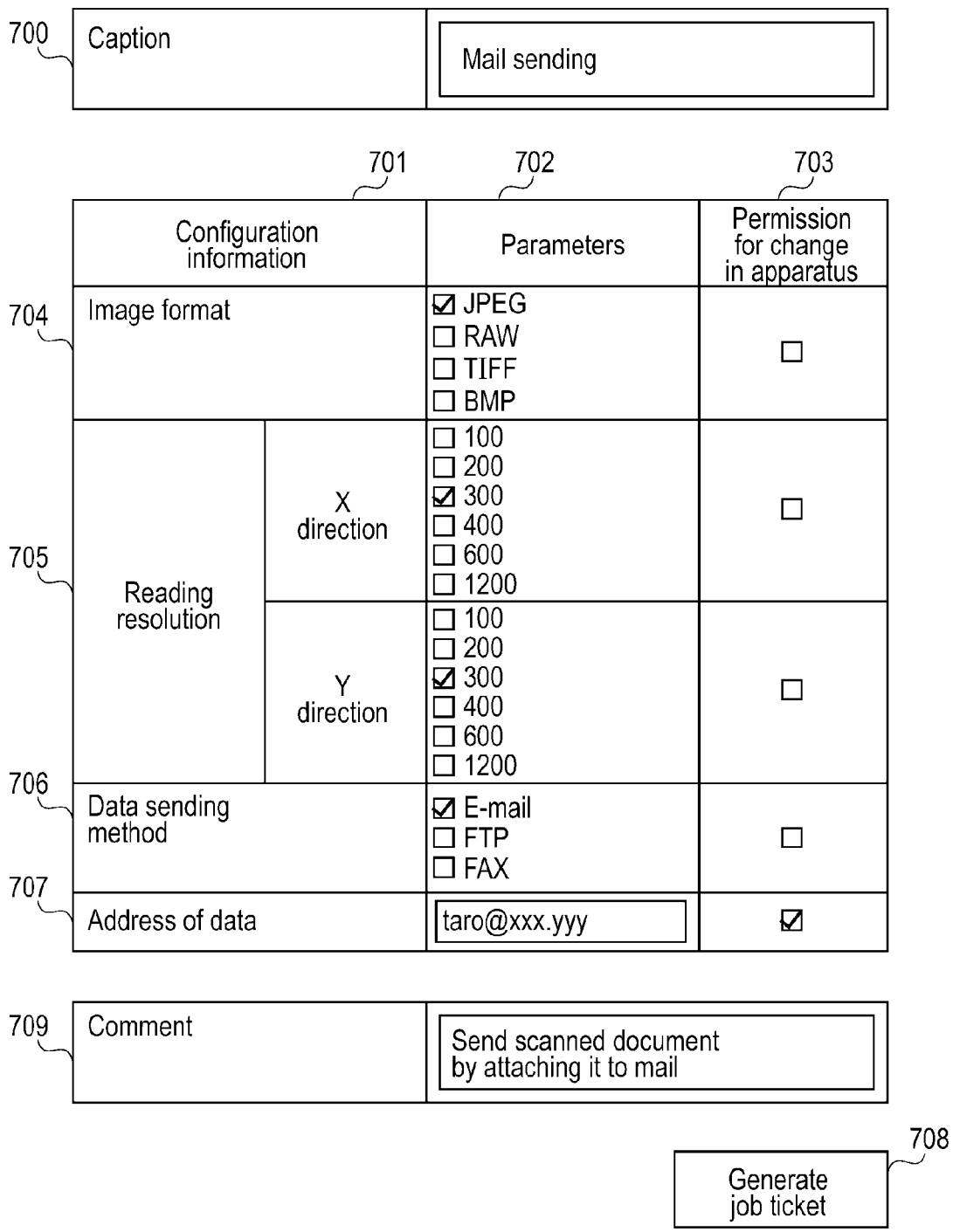
FIG. 8 illustrates a display screen of the administrator PC according to the embodiment of the present invention.

In step S605, the CPU 501 accepts setting of parameters displayed on the setting screen illustrated in FIG. 8 from the administrator.

The administrator performs setting of the respective parameters in a state where the screen illustrated in FIG. 8 is displayed. The respective parameters can be selected by using a check box. A check is made in the check box corresponding to a selected parameter.

"Caption" 700 is an item for setting the caption of a job ticket.

"Configuration information" 701 is a column of items that can be set by the administrator on the basis of the configuration of the apparatus 105. "Parameters" 702 is a column of groups of parameters that can be set for each piece of configuration information. "Permission for change in apparatus" 703 is a column for setting whether the parameters set in the administrator PC 103 can be changed via the operation unit 205 of the apparatus 105.

"Image format" 704 is an item for setting an image format, that is, an item for setting a format of image data to be obtained through conversion and stored in the HDD 213 when the apparatus 105 reads a document image by using the scanner 220. As parameters that can be set as an image format, JPEG, RAW, TIFF (Tagged Image File Format), and BMP (Bit Map) are displayed.

"Reading resolution" 705 is an item for setting a reading resolution, and is an item for setting a reading resolution when the apparatus 105 reads a document by the scanner 220. Regarding the item of the reading resolution, parameters are listed for each of an X direction (main scanning direction) and a Y direction (sub scanning direction). As parameters that can be set as a reading resolution in the X direction and Y direction, 100 dpi, 200 dpi, 300 dpi, 400 dpi, 600 dpi, and 1200 dpi are displayed in the "Reading resolution" 705.

"Data sending method" 706 is an item for setting a method for sending image data read by the scanner 220 in the apparatus 105. As parameters that can be set as a data sending method, E-mail, FTP (File Transfer Protocol), and FAX are displayed.

"Address of data" 707 is an item for setting an address of image data read by the scanner 220 in the apparatus 105. The administrator inputs an address of data by using an input unit such as a keyboard. Alternatively, setting can be made so that input of data having a format other than an E-mail address is not permitted as an address of data in a case where E-mail is selected in the "Data sending method 706.

"Comment" 709 is an item for inputting a comment about the job ticket.

In this embodiment, among the image format, reading resolution, data sending method, and address of data, only the address of data can be changed in the apparatus 105.

The administrator PC 103 accepts settings about a job ticket from the user via the above-described setting screen for performing settings of the job ticket.

When a job ticket generation button 708 is pressed in a state where settings of the respective items have been made, the administrator PC 103 generates a job ticket on the basis of the set items. Referring back to FIG. 7, when the job ticket generation button 708 is pressed, the CPU 501 determines in step S606 that an instruction to generate a job ticket has been accepted, and the process proceeds to step S607.

In step S607, the CPU 501 sets the parameters accepted in step S605 to a job ticket, thereby generating a job ticket. For example, when the job ticket generation button 708 is pressed in a state where the settings illustrated in FIG. 8 have been made, the job ticket illustrated in FIG. 18 is generated. Reference numeral 2001 in FIG. 18 denotes items including "process id" for identifying the job ticket, "creator" indicating a creator, "caption" indicating the caption of the job ticket, and "comment" indicating the comment of the job ticket. Reference numeral 2002 denotes a setting item name, and the setting about an image format is defined as "format". Reference numeral 2003 denotes values of parameters set for the setting items. The apparatus that has received the job ticket operates in accordance with the parameters defined in 2003 about the setting items defined in 2002.

Reference numerals 2004 and 2005 also denote specification about other setting items, and the job ticket is defined by a combination of such a plurality of setting items. The setting item in which "changeable" is set to 1 is an item in which the setting can be changed by the operation unit 205 of the apparatus 105. On the other hand, the setting item in which "changeable" is set to 0 is an item in which change of the setting by the operation unit 205 of the apparatus 105 is not permitted.

In step S608, the CPU 501 registers the generated job ticket in the job ticket management server 102.

In this way, generation of a job ticket and registration of the job ticket in the job ticket management server 102 by the administrator PC 103 are completed.

A user can download job tickets, each being registered in the job ticket management server 102 in the above-described manner, to the apparatus 105 and can allow the apparatus 105 and the job ticket processing server 102 to operate in accordance with information described in one of the downloaded job tickets. Here, the apparatus 105 displays the downloaded job tickets on a display unit 713 (see FIG. 11) so as to allow the user to select a job ticket. In this embodiment, display control is performed so that the user can easily select one of the downloaded job tickets.

Figure 9:
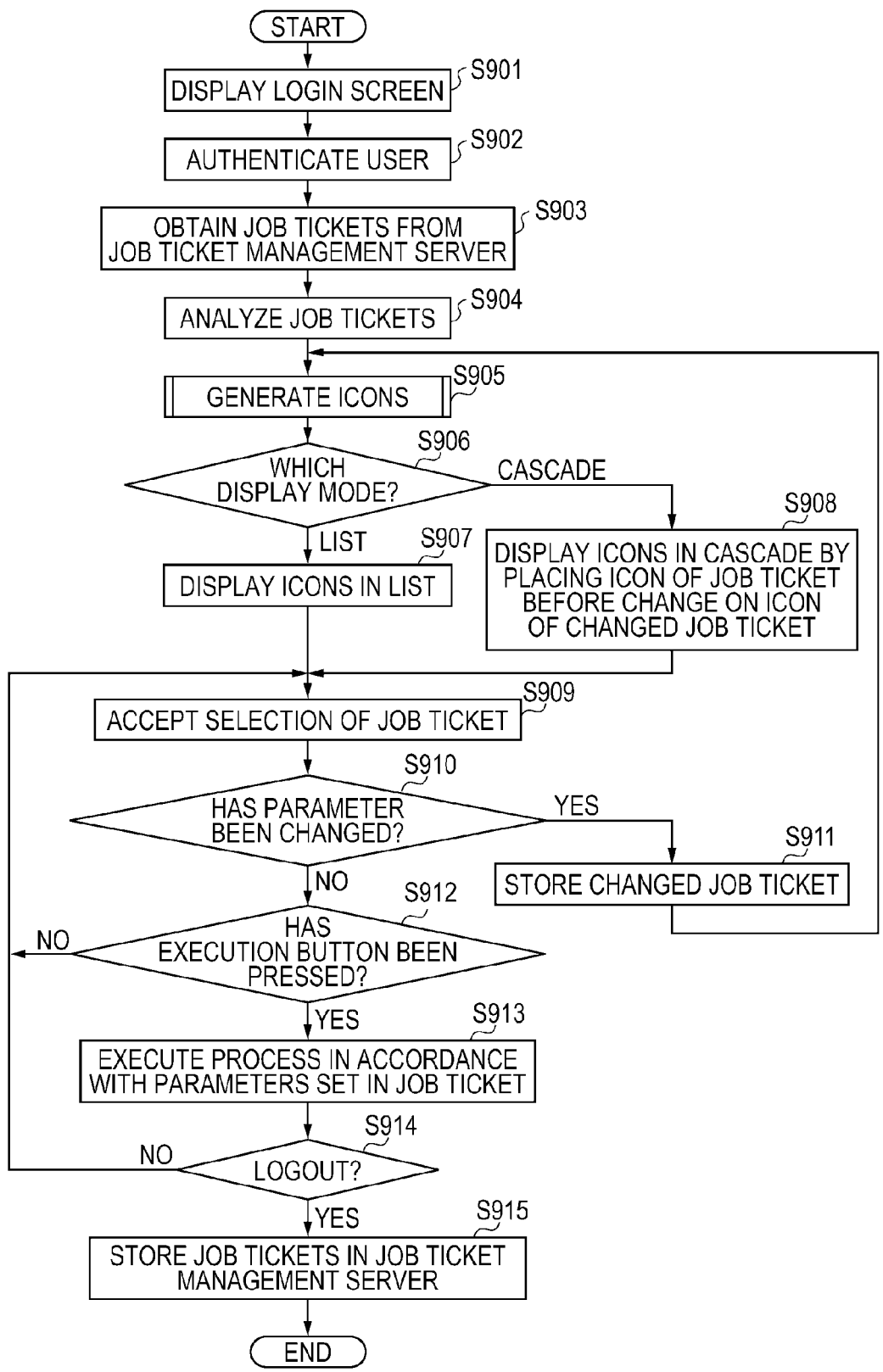
FIG. 9 is a flowchart illustrating an example of a control procedure performed by an apparatus according to the embodiment of the present invention.
Figure 10:
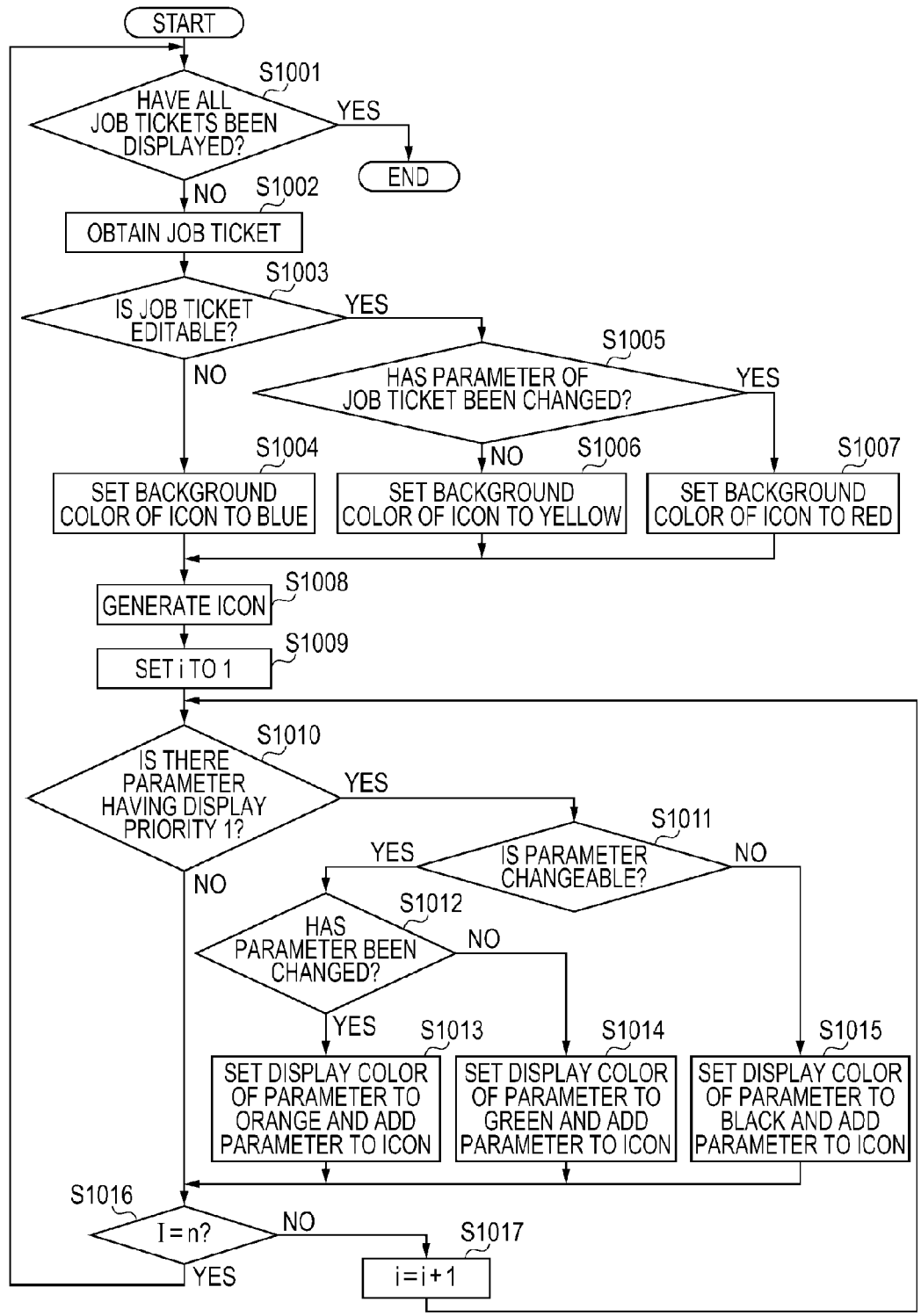
FIG. 10 is a flowchart illustrating an example of a control procedure performed by the apparatus according to the embodiment of the present invention.

Now, control performed by the CPU 202 of the apparatus 105 to allow the user to easily select a job ticket will be described with reference to FIGS. 9 and 10. The steps included in the flowcharts in FIGS. 9 and 10 are performed when the CPU 202 executes a program stored in the ROM 212.

Figure 11:
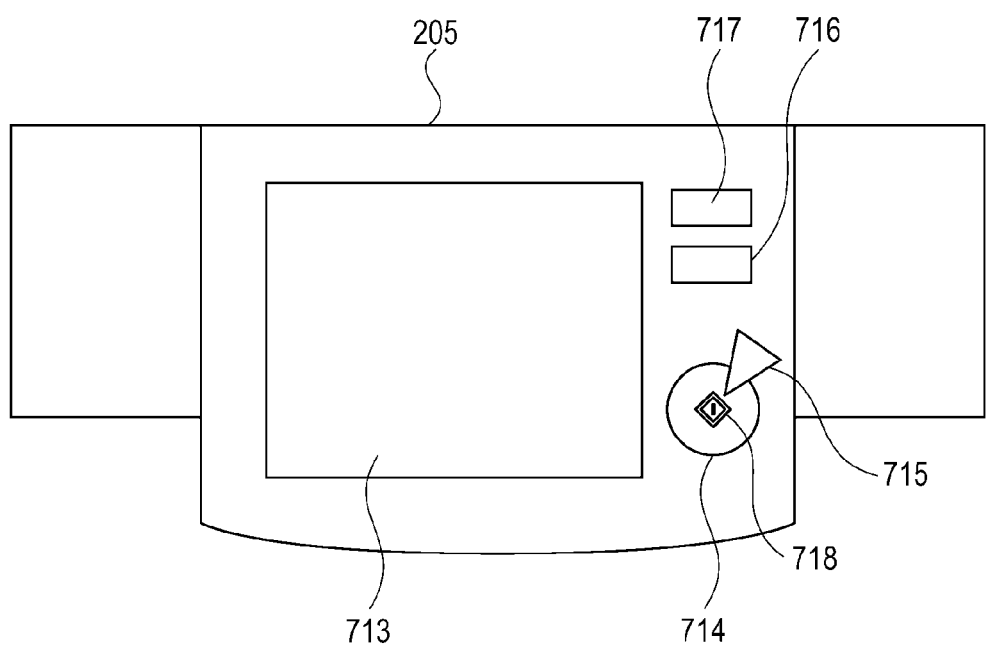
FIG. 11 illustrates an operation unit according to the embodiment of the present invention.
Figure 12:
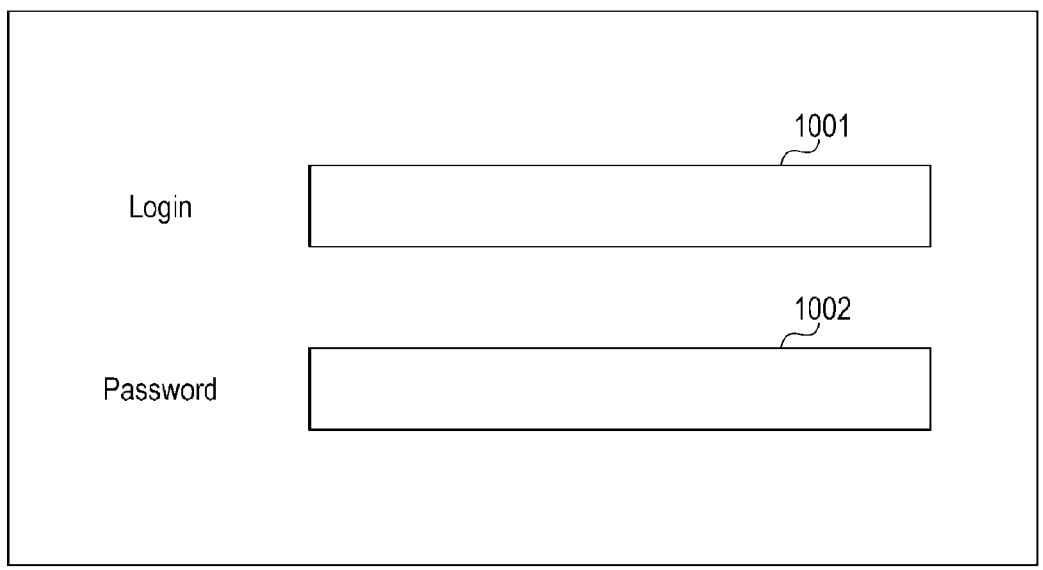
FIG. 12 illustrates a display screen according to the embodiment of the present invention.

In step S901, the CPU 202 displays the login screen illustrated in FIG. 12 on the operation unit 205 illustrated in FIG. 11. As illustrated in FIG. 11, the operation unit 205 includes the display unit 713, a start key 714, a stop key 715, an ID key 716, and a reset key 717. The display unit 713 has a configuration in which a touch panel sheet is laminated on an LCD (Liquid Crystal Display), and displays the operation screen of the apparatus 105. When a key displayed on the screen is pressed, the display unit 713 sends position information thereof to the CPU 202 of the controller unit 201. The start key 714 is used to start an operation of reading a document image by the scanner 220 of the apparatus 105. The stop key 715 is used to stop an operation of the apparatus 105. The ID key 716 is used to display a screen for inputting a user ID and a password for logging into the apparatus 105. In a case where there exists a user who has already logged into the apparatus 105, the user is logged out from the apparatus 105. The reset key 717 is used to initialize settings made on the operation unit 205. FIG. 12 illustrates an example of a screen displayed on the display unit 713 of the operation unit 205. The screen illustrated in FIG. 12 is displayed on the display unit 713 at startup of the apparatus 105 or when the ID key 716 is pressed. An input field 1001 is an area for inputting a user ID, whereas an input field 1002 is an area for inputting a password. When either of the input fields is pressed, a software keyboard is displayed on the display unit 713, so that the user can input his/her user ID and password by using the displayed software keyboard.

In step S902, the CPU 202 waits for inputting of a user ID and a password by the user and authenticates the user on the basis of the input user ID and password. After the authentication has been successfully performed, the process proceeds to step S903. In a case where the authentication has not successfully been performed, the CPU 202 displays an error message on the display unit 713 for a predetermined time, and then displays the login screen illustrated in FIG. 12 on the display unit 713.

In step S903, the CPU 202 sends, to the job ticket management server 102, the user ID input by the user and a request for obtaining job tickets corresponding to the user ID. The job ticket management server 102 specifies the user ID from the received request and sends the job tickets stored in the HDD 304 by being associated with the user ID to the apparatus 105.

In step S904, the CPU 202 receives the job tickets sent from the job ticket management server 102, stores the job tickets in the HDD 213, and analyzes the job tickets.

In step S905, the CPU 202 generates icons corresponding to the job tickets on the basis of an analysis result obtained through the analysis of the job tickets.

Specific control performed by the CPU 202 in step S905 will be described with reference to FIG. 10.

In step S1001 in FIG. 10, the CPU 202 determines whether all the job tickets stored in the HDD 213 have been displayed. In a case where all the job tickets have been displayed, the process illustrated in FIG. 10 ends and the process proceeds to step S906 in FIG. 9. In a case where not all the job tickets have been displayed, the process proceeds to step S1002.

In step S1002, the CPU 202 obtains a job ticket that has not yet been obtained among the job tickets stored in the HDD 213. At this time, the job ticket having the oldest date/time of generation is obtained. The date/time of generation is associated with each job ticket and is managed by the job ticket management server 102. The apparatus 105 downloads job tickets together with their date/time of generation from the job ticket management server 102 and stores the job tickets in the HDD 213.

In step S1003, the CPU 202 determines whether the obtained job ticket is editable on the basis of whether the job ticket includes a parameter of changeable="1". In a case where the CPU 202 determines that the job ticket does not include a parameter of changeable="1", the process proceeds to step S1004, where the CPU 202 sets the background color of the icon to blue, and the process proceeds to step S1008. On the other hand, in a case where the CPU 202 determines that the job ticket includes a parameter of changeable="1", the process proceeds to step S1005.

In step S1005, the CPU 202 determines whether a parameter in the job ticket has been changed on the basis of a process id in the job ticket. In a case where a parameter in the job ticket has been changed, the CPU 202 performs control so that the process id in the job ticket is attached in a form different from that before the parameter is changed. For example, in a case where the address in the job ticket illustrated in FIG. 18 is changed by the operation unit 205 of the apparatus 105, the job ticket illustrated in FIG. 19 is generated as another job ticket different from the original job ticket by the CPU 202 and is stored in the HDD 213. At this time, assume that the process id in the original job ticket is "0001", then the CPU 202 sets the process id in the job ticket that is newly generated by changing the parameter in the job ticket to "0001-1". In such a case where an id including a hyphen is given as a process id, the CPU 202 determines in step S1005 that a parameter in the job ticket has been changed, and the process proceeds to step S1007. In step S1007, the CPU 202 sets the background color of the icon to red, and the process proceeds to step S1008. On the other hand, in a case where the CPU 202 determines in step S1005 that an id including a hyphen is not given as the process id in the job ticket, the process proceeds to step S1006, where the CPU 202 sets the background color of the icon to yellow, and the process proceeds to step S1008.

In step S1008, the CPU 202 generates the icon with the set background color. Here, the CPU 202 holds in advance image data of the icon in the HDD 213 and adds information about parameters in the received job ticket to the icon, thereby generating the icon. A process of adding the parameters in the job ticket to the generated icon will be described below regarding step S1009 and thereafter. The icon is an object that is displayed for each of job tickets 2101 to 2107 illustrated in FIG. 14. The user can select a desired job ticket by selecting the corresponding icon.

In step S1009, the CPU 202 initializes a flag i to 1.

In step S1010, the CPU 202 refers to the display priority management table illustrated in FIG. 20 and determines whether a parameter having a display priority i exists in the job ticket. The display priority management table illustrated in FIG. 20 is managed by the HDD 213. In a case where the CPU 202 determines that a parameter having a display priority 1 exists in the job ticket, the process proceeds to step S1011. Otherwise, the process proceeds to step S1016.

In step S1011, the CPU 202 determines whether the parameter having a display priority 1 is changeable. In a case where "changeable" is set to 1 in the parameter, the CPU 202 determines that the parameter is changeable, and the process proceeds to step S1012. Otherwise, the process proceeds to step S1015. In step S1015, the CPU 202 sets the display color of the parameter to black and performs control so that the parameter is added to the icon using black characters. Then, the process proceeds to step S1016.

On the other hand, in step S1012, the CPU 202 determines whether the parameter having a display priority 1 has already been changed. In a case where the CPU 202 determines that the parameter has already been changed, the process proceeds to step S1013. In a case where the CPU 202 determines that the parameter has not yet been changed, the process proceeds to step S1014. In step S1014, the CPU 202 sets the display color of the parameter having a display priority 1 to green and performs control so that the parameter is added to the icon using green characters. On the other hand, in step S1013, the CPU 202 performs control so that the parameter having a display priority 1 is added to the icon using orange characters.

Such a process is repeated the number of times corresponding to the number of levels of display priority specified in the display priority management table. Then, the CPU 202 performs step S1016.

As a specific example of the process from step S1003 to step S1017, a case where the apparatus 105 displays the job ticket illustrated in FIG. 18 will be described. Here, assume that the apparatus 105 has the display priority management table illustrated in FIG. 20 in the HDD 213.

First, the CPU 202 determines whether any change has been made in the job ticket illustrated in FIG. 18. In the job ticket illustrated in FIG. 18, "changeable" is set to 1 for the address and the process id does not include a hyphen. Thus, the CPU 202 sets the background color of the icon to yellow and generates the icon.

Then, the CPU 202 performs a process of adding a parameter "caption" (defined by caption) having a display priority 1 to the icon. Here, the parameter "caption" illustrated in FIG. 18 is not a changeable parameter, and thus the caption "mail sending" in black characters is added to the icon. Then, the CPU 202 performs a process of adding a parameter "comment" (defined by comment) having a display priority 2 to the icon. The parameter "comment" illustrated in FIG. 18 is not a changeable parameter, and thus the comment "send scanned document by attaching it to mail" in black characters is added to the icon. Finally, the CPU 202 performs a process of adding a parameter "address" (defined by address) having a display priority 3 to the icon. The parameter "address" illustrated in FIG. 18 is a changeable parameter and has not yet been changed, and thus an address "taro@xxx.yyy" in green characters is added.

The CPU 202 determines whether each of the parameters in the job ticket has been changed on the basis of the edit management table illustrated in FIG. 21. For example, the edit management table indicates that the job ticket in which the process id is "0001-1" is generated by changing the parameter (address) in the job ticket in which the process id is "0001".

By repeating the above-described process from step S1010 to step S1017, an icon added with respective parameters that are set to be displayed in the display priority management table is generated. The icon corresponding to the job ticket illustrated in FIG. 18 is an icon 2101 illustrated in FIG. 14, for example. Also, the CPU 202 performs control so that a flow of processes specified in the job ticket corresponding to the icon is displayed on the icon using figures that can specify processing types. For example, the job ticket illustrated in FIG. 18 is defined so that a document is to be read at a resolution of 300 dpi×300 dpi, is to be converted into a JPEG format, and is to be sent by E-mail. Therefore, the figures representing those processes are displayed at the top of the icon 2101.

Those figures are stored in the HDD 213 in advance, and the CPU 202 performs control so that the figures are selected and displayed in accordance with the information in the job ticket.

The process from step S1001 to step S1017 is repeated the number of times corresponding to the number of job tickets stored in the HDD 213. Then, the process illustrated in FIG. 10 ends and the process proceeds to step S906 in FIG. 9.

Figure 13:
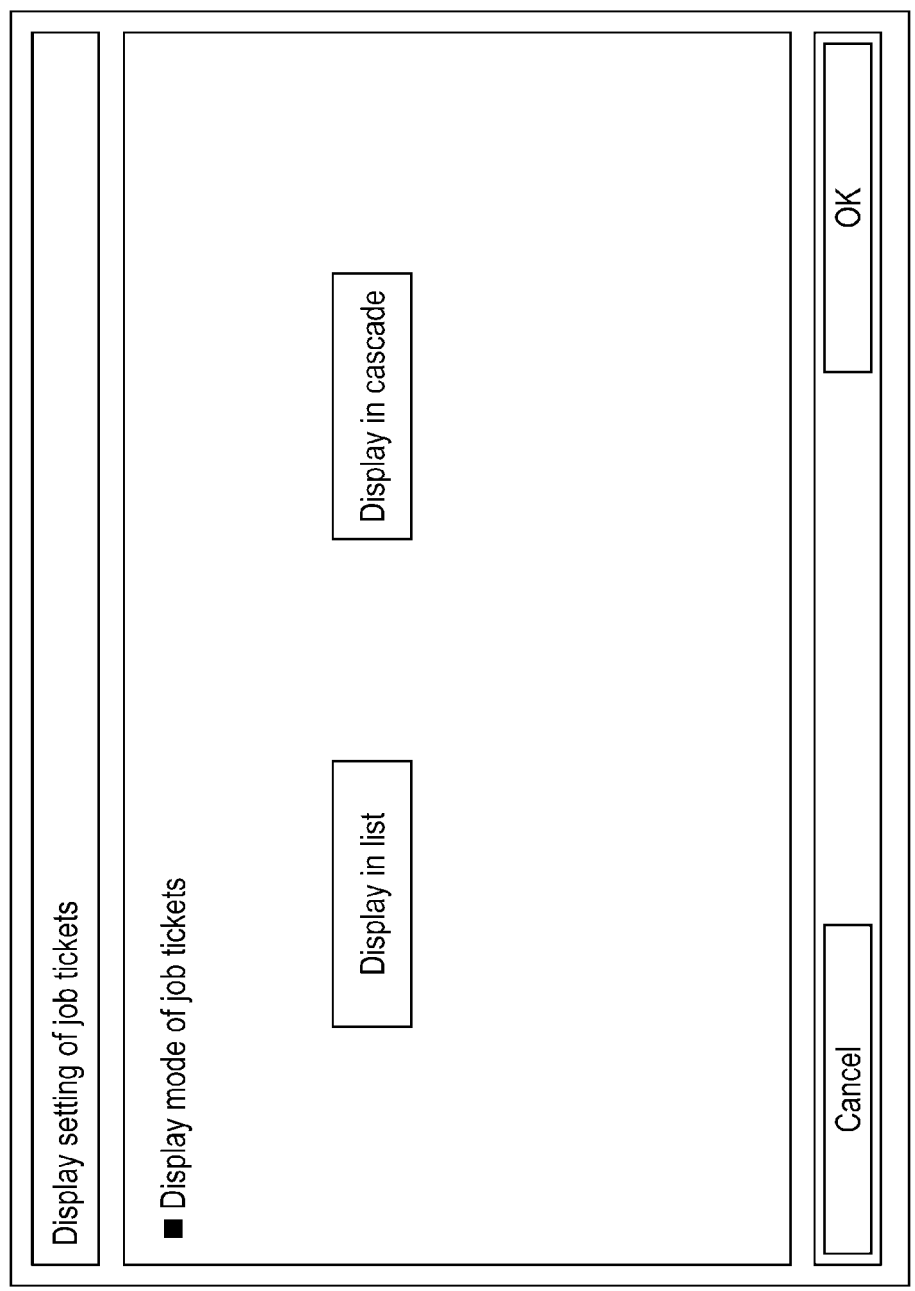
FIG. 13 illustrates a display screen according to the embodiment of the present invention.

In step S906, the CPU 202 displays the screen illustrated in FIG. 13 on the operation unit 205 in order to allow the user to select a display mode of the icons generated in step S905.

In a case where a "display in list" button is pressed by the user in step S906, the CPU 202 allows the process to proceed to step S907. In a case where a "display in cascade" button is pressed by the user, the CPU 202 allows the process to proceed to step S908.

Figure 14:
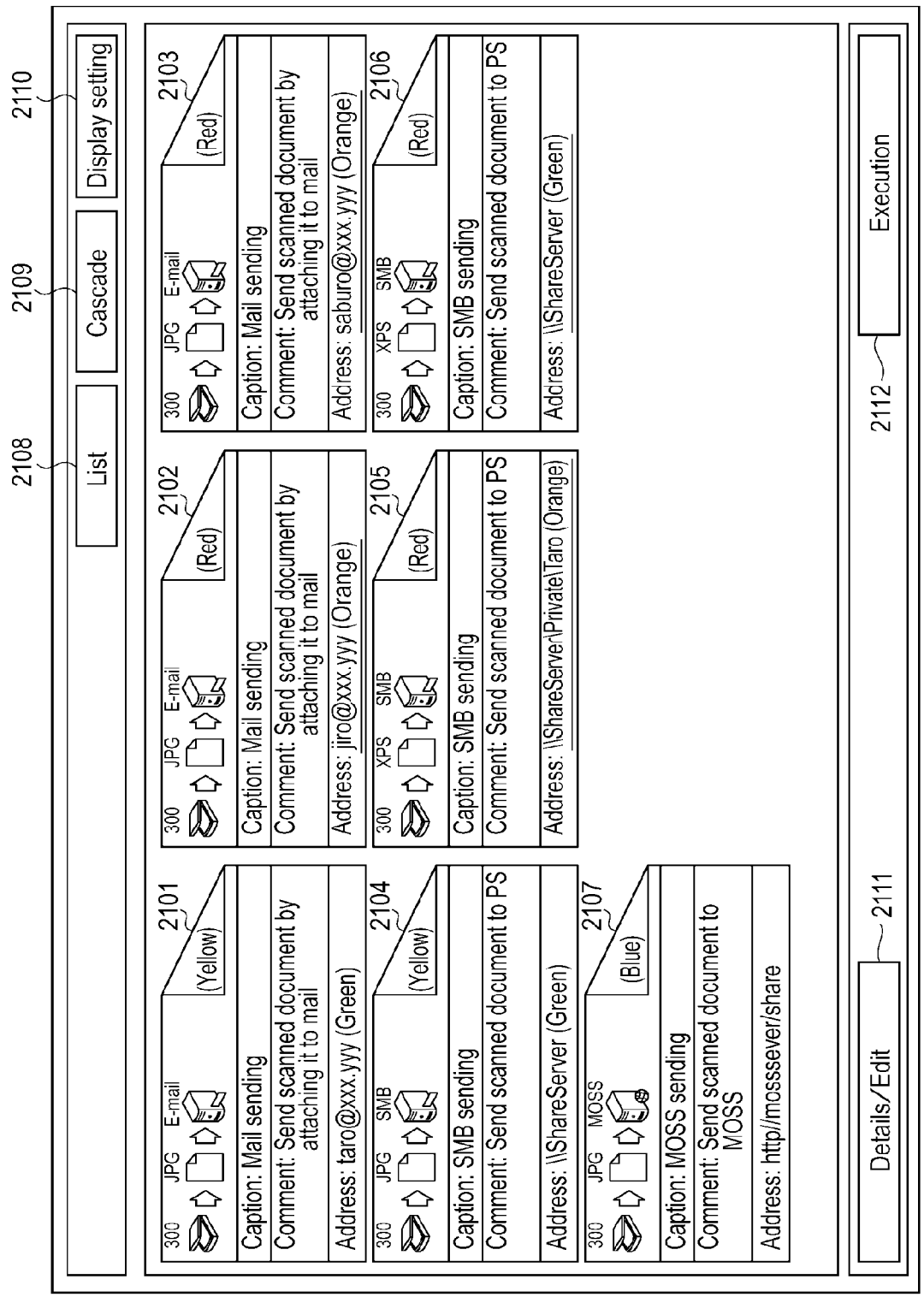
FIG. 14 illustrates a display screen according to the embodiment of the present invention.

In step S907, the CPU 202 displays the plurality of job tickets in a list, as illustrated in FIG. 14.

Figure 15:
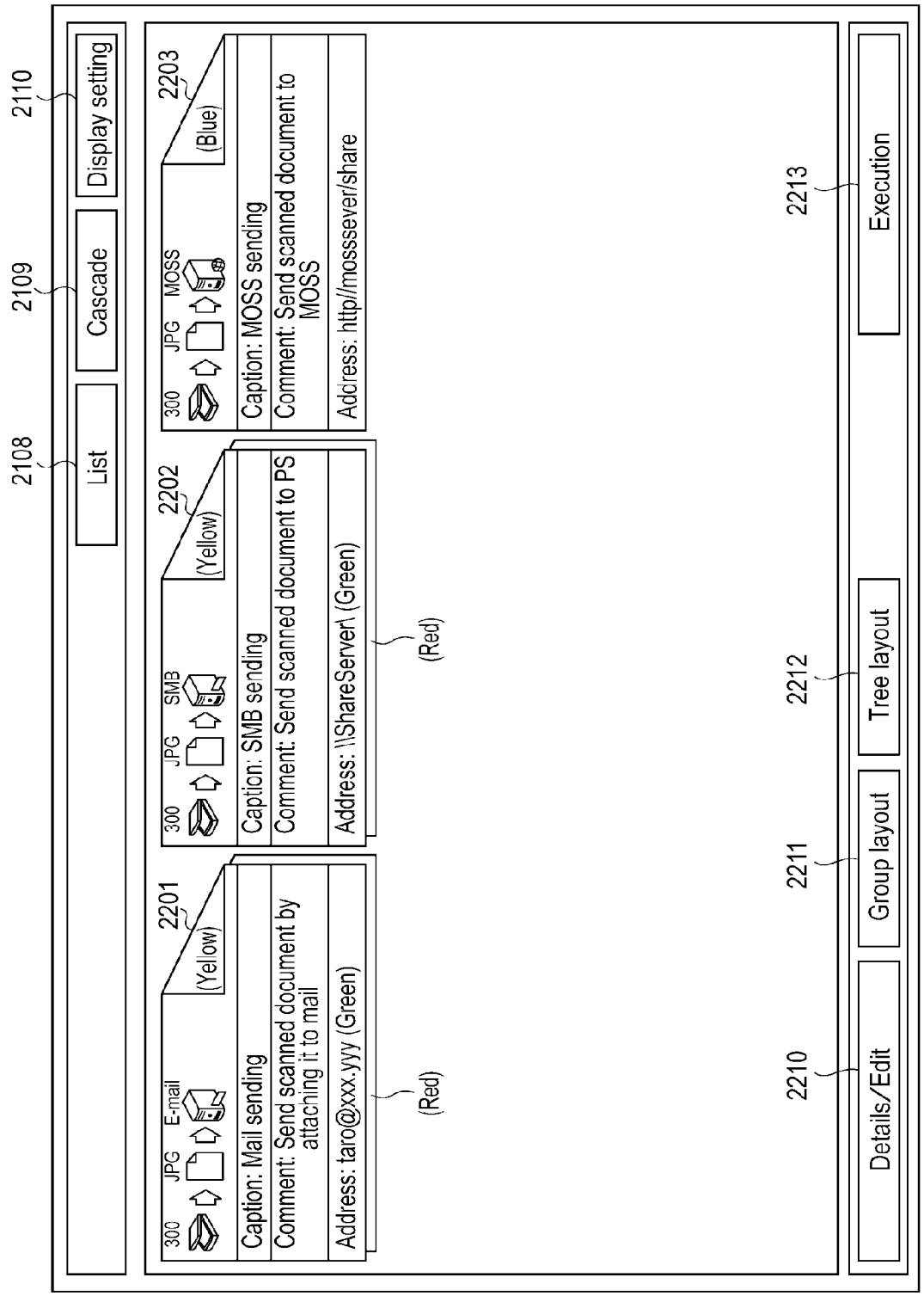
FIG. 15 illustrates a display screen according to the embodiment of the present invention.

On the other hand, in step S908, the CPU 202 displays the icons of the plurality of job tickets such that the icon of the job ticket before change overlaps the icon of the changed job ticket, as illustrated in FIG. 15. At this time, the CPU 202 displays the job tickets such that the job ticket before change is at the top and that the changed job ticket is hidden under the job ticket before change.

In such a state where the job tickets are displayed in the form of icons, the process proceeds to step S909, where the CPU 202 accepts selection of a job ticket by the user. A selected state of a once-selected job ticket is canceled when the job ticket is selected again.

In step S910, the CPU 202 determines whether a parameter in the selected job ticket has been changed. The user can display a screen for changing a changeable parameter among the parameters included in the job ticket by pressing a "details/edit" button 2111 illustrated in FIG. 14 or a "details/edit" button 2210 illustrated in FIG. 15. Then, in a case where a confirmation instruction is provided in a state where a changeable parameter has been changed, the process proceeds to step S911.

In step S911, the CPU 202 stores the job ticket in which the changed parameter is reflected in the HDD 213, the job ticket being regarded as another job ticket different from the job ticket before change, and the process returns to step S905.

On the other hand, in a case where the CPU 202 determines in step S910 that no parameter in the job ticket has been changed, the process proceeds to step S912. In step S912, the CPU 202 determines whether an execution button has been pressed in a state where a job ticket is selected. In a case where the CPU 202 determines that the execution button has not been pressed, the process returns to step S909. In a case where the CPU 202 determines that the execution button has been pressed, the process proceeds to step S913.

In step S913, the CPU 202 executes a process in accordance with the respective parameters in the job ticket in a selected state.

For example, in a case where the execution button 2112 is pressed in a state where the job ticket 2101 illustrated in FIG. 14 is selected, the CPU 202 allows the scanner 220 to read a document image at a reading resolution of 300 dpi×300 dpi. Then, the CPU 202 converts the image into a JPEG format and sends the converted image and the job ticket to the job ticket processing server 102. The job ticket processing server 102 sends the image sent from the apparatus 105 to "taro@xxx.yyy" by attaching the image to a mail in accordance with the received job ticket.

In step S914, the CPU 202 determines whether a logout instruction has been received from the user via the ID key 716. In a case where the logout instruction has not yet been received, the process returns to step S909. In a case where the logout instruction has been received, the process proceeds to step S915.

In step S915, the CPU 202 sends the job ticket before change of the parameter and the job ticket after change of the parameter stored in the HDD 213 to the job ticket management server 102 together with the user ID, and the process ends.

The job ticket management server 102 receives the job tickets and the user ID, and stores the job tickets by associating the job tickets with the received user ID. Accordingly, the job ticket management server 102 can send the job ticket that is stored by being associated with the user ID and that has a changed parameter to the apparatus 105 when a request for obtaining the job ticket is received next time.

Incidentally, while the screen illustrated in FIG. 15 is displayed, the user may wants to see information in a job ticket hidden under a job ticket. In that case, the user can see the information in the hidden job ticket by pressing a group layout button 2211 or a tree layout button 2212.

Figure 16:
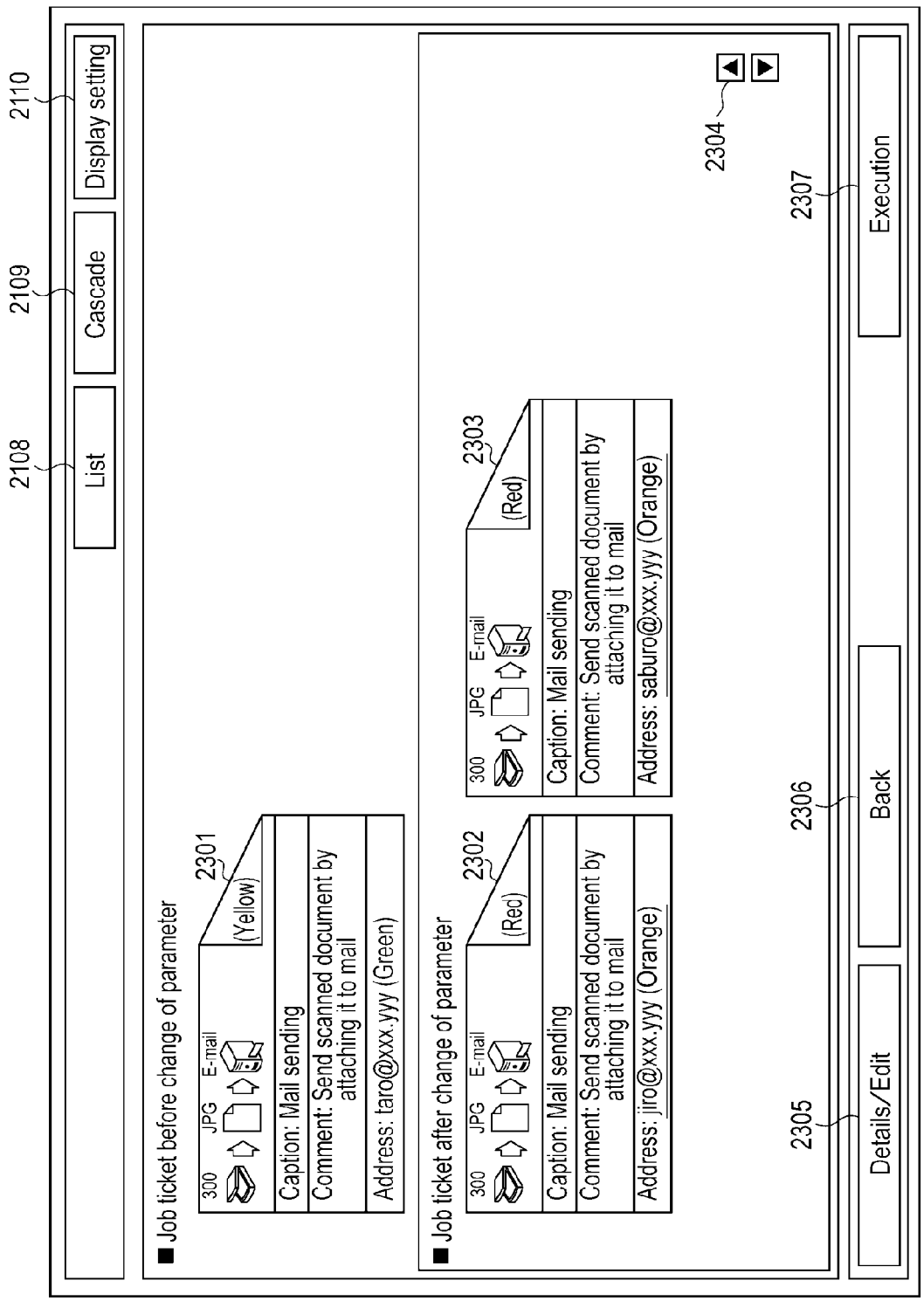
FIG. 16 illustrates a display screen according to the embodiment of the present invention.

For example, when the group layout button 2211 is pressed, the screen illustrated in FIG. 16 is displayed. On this screen, a job ticket before change of a parameter and job tickets after change of a parameter are displayed in different display areas.

Figure 17:
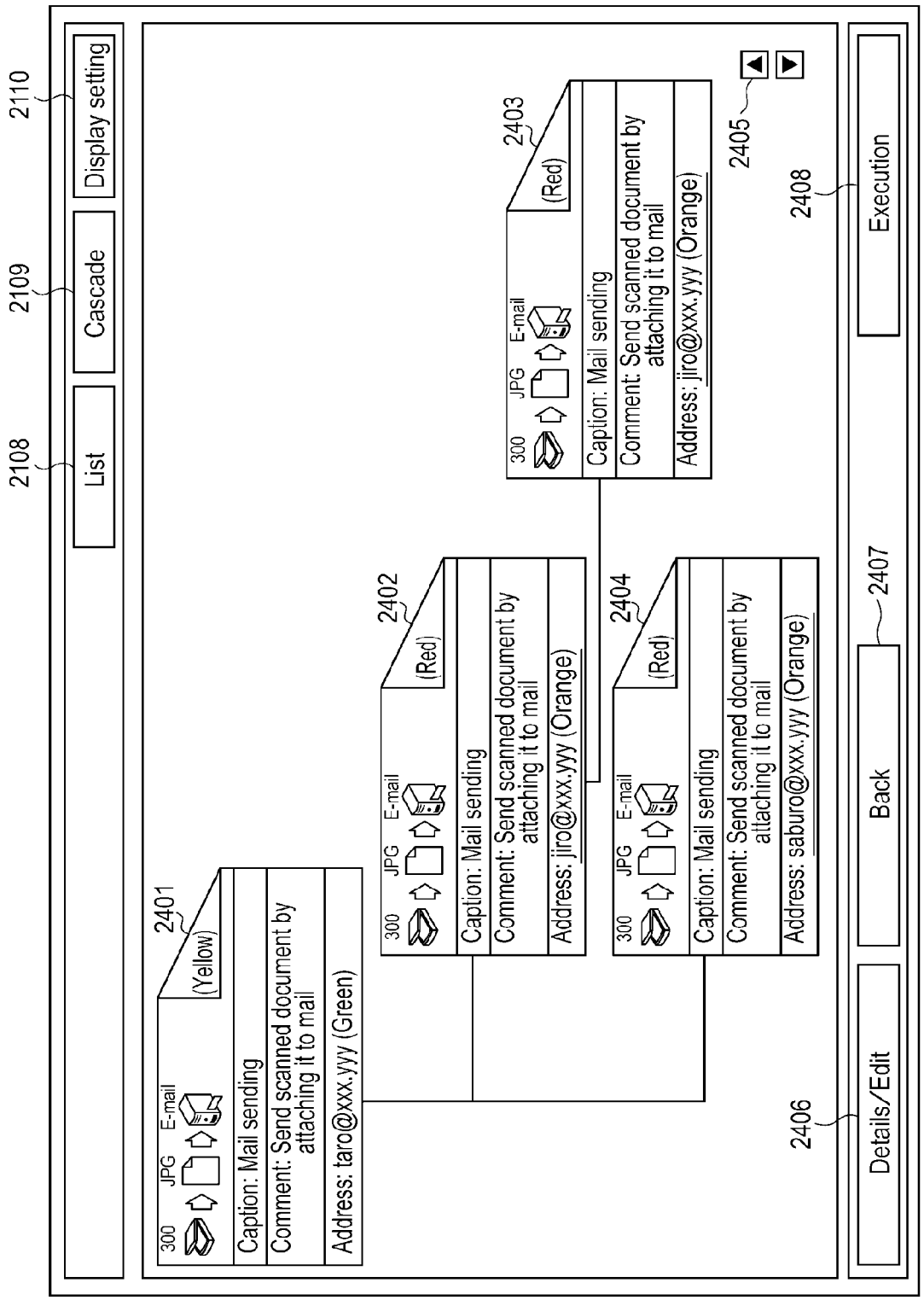
FIG. 17 illustrates a display screen according to the embodiment of the present invention.

On the other hand, when the tree layout button 2212 is pressed, the screen illustrated in FIG. 17 is displayed. On this screen, a job ticket before change of a parameter and job tickets after change of a parameter are displayed in a hierarchical structure.

The CPU 202 displays those job tickets in such display modes in accordance with the information in the edit management table.

As described above, the CPU 202 of the apparatus 105 displays icons of job tickets in accordance with processing information in the job tickets, image data of icons stored in advance in the HDD 213, and a display method (display pattern) of the display priority management table and the like. For example, the CPU 202 displays each job ticket in the form of an icon and adds processing information as parameters included in the job ticket to the icon, so that the user can easily understand the processing information described in the job ticket.

Also, the background color of the icon in a case where a changeable parameter is included in the job ticket is different from that in a case where a changeable parameter is not included in the job ticket. Accordingly, the user can easily recognize whether a changeable parameter is included in the job ticket.

Furthermore, among a plurality of parameters included in the job ticket, a changeable parameter is displayed in a different color of characters from that of an unchangeable parameter. Accordingly, the user can easily recognize the parameter that is changeable.

Furthermore, among a plurality of parameters included in the job ticket, a changed parameter is displayed in a different color of characters from that of an unchanged parameter. Accordingly, the user can easily recognize the parameter that has been changed.

Also, the user can switch the display mode of a plurality of job tickets between display in list and display in cascade.

In the above-described embodiment, a description has been given about an example of displaying an icon of a different color in a case where the job ticket includes a changeable parameter. Alternatively, in such a case, the shape of the icon or the font of a character string included in the icon may be changed. Any other methods can also be used as long as the display pattern of the icon is changed.

In the above-described embodiment, a description has been given about an example of displaying a changeable parameter in a different color from that of an unchangeable parameter among parameters included in the job ticket. Alternatively, the font of a character string may be changed.

Furthermore, the display priority of each parameter defined in the display priority management table according to the above-described embodiment may be changeable by a user. When a high priority is put on a parameter desired to be displayed by the user among the parameters included in the job ticket, the high-priority parameter is displayed on the icon. Alternatively, input of a password different from the password input by the user to log into the apparatus 105 may be requested to the user when the display priority is to be changed. Accordingly, the person who can change the display priority can be limited to, for example, an administrator.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus to execute a process defined in a job ticket, the image processing apparatus comprising:
   a storage unit configured to store figures indicating types of processes;
   a receiving unit configured to receive a job ticket defining a plurality of processes; a specifying unit configured to specify types of the plurality of processes defined by the job ticket received by the receiving unit;
   a selecting unit configured to select figures indicating the types of the plurality of processes specified by the specifying unit from among the figures stored in the storage unit; and
   a display control unit configured to control a display unit to display the job ticket and the figures selected by the selecting unit in order of executing the plurality of processes indicated by the figures, wherein the figures include a first figure indicating scanning process for scanning a document, and a second figure indicating a sending process for sending image data obtained from the scanned document.

2. The image processing apparatus according to claim 1, wherein the display control unit controls the display unit to display the job ticket in different display patterns in a case where the job ticket includes a changeable piece of information that can be changed by a user and in a case where the job ticket includes no changeable piece of information.

3. The image processing apparatus according to claim 1, wherein the display control unit controls the display unit to display the job ticket in different display patterns in a case where a piece of information included in the job ticket has been changed and in a case where a piece of information included in the job ticket has not been changed.

4. The image processing apparatus according to claim 1, wherein the display control unit controls the display unit to display the job ticket by associating the job ticket with a plurality of parameters corresponding to pieces of information about the plurality of processes.

5. The image processing apparatus according to claim 1, wherein the display control unit controls the display unit to display a changeable piece of information that can be changed by a user among pieces of information about the plurality of processes included in the job ticket such that the user can recognize the changeable piece of information.

6. The image processing apparatus according to claim 1, wherein the display control unit controls the display unit to display a piece of information changed by a user among pieces of information about the plurality of processes included in the job ticket such that the user can recognize the changed piece of information.

7. A control method for controlling an image processing apparatus to execute a process defined in a job ticket, the control method comprising:
   storing, in a storage unit, figures indicating types of processes;
   receiving a job ticket defining a plurality of processes;
   specifying types of the plurality of processes defined by the received job ticket;
   selecting figures indicating the specified types of the plurality of processes from among the figures stored in the storage unit; and
   controlling a display unit to display the job ticket and the selected figures in order of executing the plurality of processes indicated by the figures, wherein the figures include a first figure indicating scanning process for scanning a document, and a second figure indicating a sending process for sending image data obtained from the scanned document.

8. The control method according to claim 7, wherein controlling includes controlling the display unit to display the job ticket in different display patterns in a case where the job ticket includes a changeable piece of information that can be changed by a user and in a case where the job ticket includes no changeable piece of information.

9. The control method according to claim 7, wherein controlling includes controlling the display unit to display the job ticket in different display patterns in a case where a piece of information included in the job ticket has been changed and in a case where a piece of information included in the job ticket has not been changed.

10. The control method according to claim 7, wherein controlling includes controlling the display unit to display the job ticket by associating the job ticket with a plurality of parameters corresponding to pieces of information about the plurality of processes.

11. The control method according to claim 7, wherein controlling includes controlling the display unit to display a changeable piece of information that can be changed by a user among pieces of information about the plurality of processes included in the job ticket such that the user can recognize the changeable piece of information.

12. The control method according to claim 7, wherein controlling includes controlling the display unit to display a piece of information changed by a user among pieces of information about the plurality of processes included in the job ticket such that the user can recognize the changed piece of information.

13. A non-transitory computer-readable storage medium storing a program to cause an image processing apparatus to perform a control method for controlling the image processing apparatus to execute a process defined in a job ticket, the control method comprising:
   storing, in a storage unit, figures indicating types of processes;
   receiving a job ticket defining a plurality of processes;
   specifying types of the plurality of processes defined by the received job ticket;
   selecting figures indicating the specified types of the plurality of processes from among the figures stored in the storage unit; and
   controlling a display unit to display the job ticket and the selected figures in order of executing the plurality of processes indicated by the figures, wherein the figures include a first figure indicating scanning process for scanning a document, and a second figure indicating a sending process for sending image data obtained from the scanned document.

14. The non-transitory computer-readable storage medium according to claim 13, wherein controlling includes controlling the display unit to display the job ticket in different display patterns in a case where the job ticket includes a changeable piece of information that can be changed by a user and in a case where the job ticket includes no changeable piece of information.

15. The non-transitory computer-readable storage medium according to claim 13, wherein controlling includes controlling the display unit to display the job ticket in different display patterns in a case where a piece of information included in the job ticket has been changed and in a case where a piece of information included in the job ticket has not been changed.

16. The non-transitory computer-readable storage medium according to claim 13, wherein controlling includes controlling the display unit to display the job ticket by associating the job ticket with a plurality of parameters corresponding to pieces of information about the plurality of processes.

17. The non-transitory computer-readable storage medium according to claim 13, wherein controlling includes controlling the display unit to display a changeable piece of information that can be changed by a user among pieces of information about the plurality of processes included in the job ticket such that the user can recognize the changeable piece of information.

18. The non-transitory computer-readable storage medium according to claim 13, wherein controlling includes controlling the display unit to display a piece of information changed by a user among pieces of information about the plurality of processes included in the job ticket such that the user can recognize the changed piece of information.

* * * * *